(12) United States Patent
Ortiz

(10) Patent No.: US 8,183,703 B2
(45) Date of Patent: May 22, 2012

(54) SEA WAVE TURBINE SPEED CONTROL

(75) Inventor: Israel Ortiz, Guayama, PR (US)

(73) Assignee: Israel Ortiz, Guayama, PR (US)

( * ) Notice: Subject to any disclaimer, the term of this patent is extended or adjusted under 35 U.S.C. 154(b) by 0 days.

(21) Appl. No.: 13/134,539

(22) Filed: Jun. 10, 2011

(65) Prior Publication Data

US 2011/0291412 A1 Dec. 1, 2011

Related U.S. Application Data

(63) Continuation of application No. 12/800,794, filed on May 24, 2010, and a continuation of application No. 12/800,035, filed on May 7, 2010, and a continuation of application No. 12/291,362, filed on Nov. 7, 2008, now Pat. No. 8,030,789.

(51) Int. Cl.
*F03B 13/10* (2006.01)

(52) U.S. Cl. .......................................... 290/43; 290/42
(58) Field of Classification Search ................... 290/42, 290/43, 53, 54; 60/318; 415/3.1
See application file for complete search history.

(56) References Cited

U.S. PATENT DOCUMENTS

| 3,236,498 | A | * | 2/1966 | Kerensky | 290/43 |
| 5,377,485 | A | * | 1/1995 | Bellamy | 60/398 |
| 7,525,213 | B2 | * | 4/2009 | Nagata et al. | 290/53 |
| 2011/0193348 | A1 | * | 8/2011 | Rourke | 290/53 |

* cited by examiner

*Primary Examiner* — Tho D Ta

(57) ABSTRACT

A valve that controls the speed of a turbine that is moved by an oscillating air column. This turbine's speed is constantly being compared with the constant output of a digital oscillator. The deference between this two is an error voltage that is amplified and applied to the servomotor. That will increase or decrease the air flow to meantime the speed of the turbine constant and in phase with the digital oscillator. This valve is placed between the input of the turbine and the output of the pressure chamber or the oscillating air column.

11 Claims, 2 Drawing Sheets

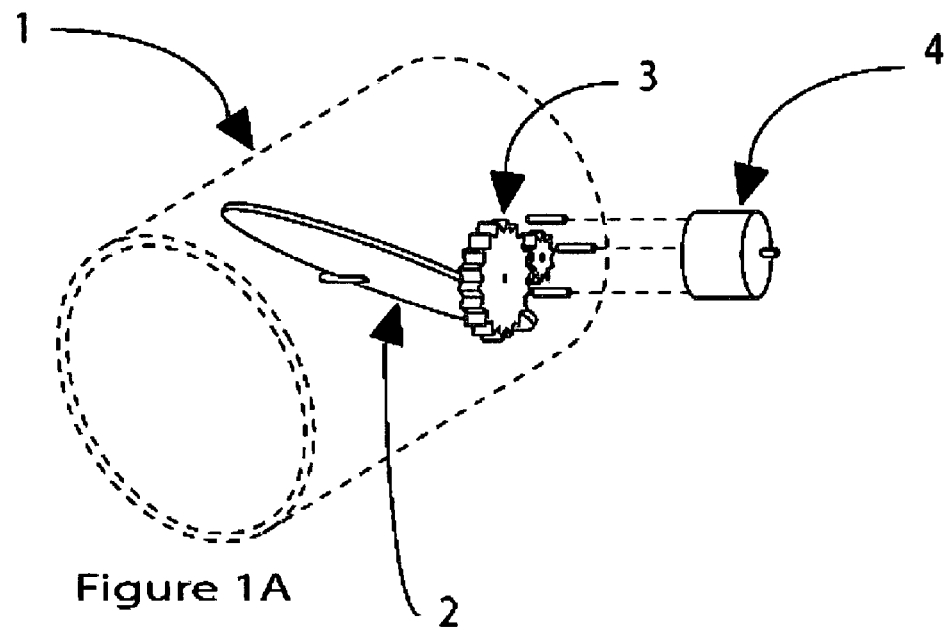
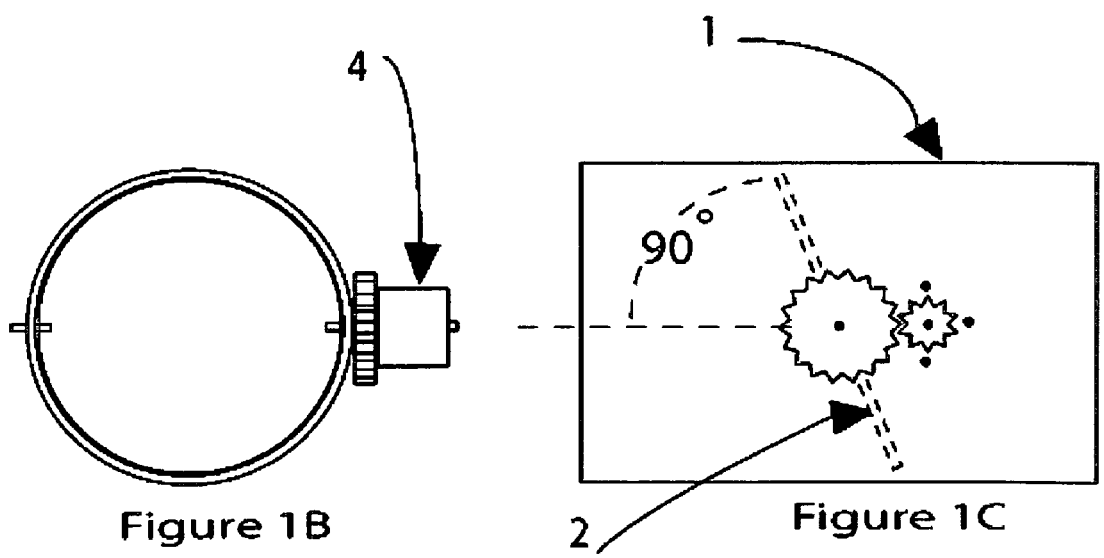
Figure 1A
Figure 1B
Figure 1C

SEA WAVE TURBINE SPEED CONTROL

RELATED APPLICATIONS

The present application is a continuation application of U.S. provisional patent application, Ser. No. 12/291,362, filed Nov. 7, 2008 now U.S. Pat. No. 8,030,789, for WAVE TURBINE, by Israel Ortiz, included by reference herein and for which benefit of the priority date is hereby claimed.

The present application is a continuation application of U.S. provisional patent application, Ser. No. 12/800,035, filed May 7, 2010, for THE ORTIZ TURBINE, by Israel Ortiz, included by reference herein and for which benefit of the priority date is hereby claimed.

The present application is a continuation application of U.S. provisional patent application, Ser. No. 12/800,794, filed May 24, 2010, for BACK TO BACK TURBINE, by Israel Ortiz, included by reference herein and for which benefit of the priority date is hereby claimed.

FIELD OF THE INVENTION

The present invention relates to an air flow control valve and, more particularly, to a valve used to control the speed of the turbines used to convert the sea waves to motive power.

BACKGROUND OF THE INVENTION

The turbines used to produce power from sea waves like the Wave turbine, The Ortiz Turbine and Back to Back Turbine cannot maintain a constant speed because of the variation in amplitude and wave length of this waves. Therefore some form of control is needed like the present invention.

Other solution to this problem is a variable pitch blade that changes in accord to the change of sea waves.

This solution of changing the pitch of the blades is to complex and will produce the same result as the present invention which is simpler and need less maintenance.

It is therefore an object of the invention to provide a constant rotation of the turbine with the constant change in amplitude and wave length of sea waves.

It is another object of the invention to maintain the control system as simple as possible to make it more reliable.

It is another object of the invention to because of its simplicity, to make it work with less maintenance

SUMMARY OF THE INVENTION

A valve that controls the speed of a turbine that is moved by an oscillating air column. This turbine's speed is constantly being compared with the constant output of a digital oscillator. The deference between this two is an error voltage that is amplified and applied to the servomotor. That will increase or decrease the air flow to meantime the speed of the turbine constant and in phase with the digital oscillator. This flow control valve is placed between the input of the turbine and the output of the pressure chamber or the oscillating air column.

BRIEF DESCRIPTION OF THE DRAWINGS

A complete understanding of the present invention may be obtained by reference to the accompanying drawings, when considered in conjunction with the subsequent, detailed description, in which:

FIG. 1 is a perspective view of an air flow valve that is used to control the speed of the turbine.

For purposes of clarity and brevity, like elements and components will bear the same designations and numbering throughout the Figures.

DESCRIPTION OF THE PREFERRED EMBODIMENT

Figure 2:
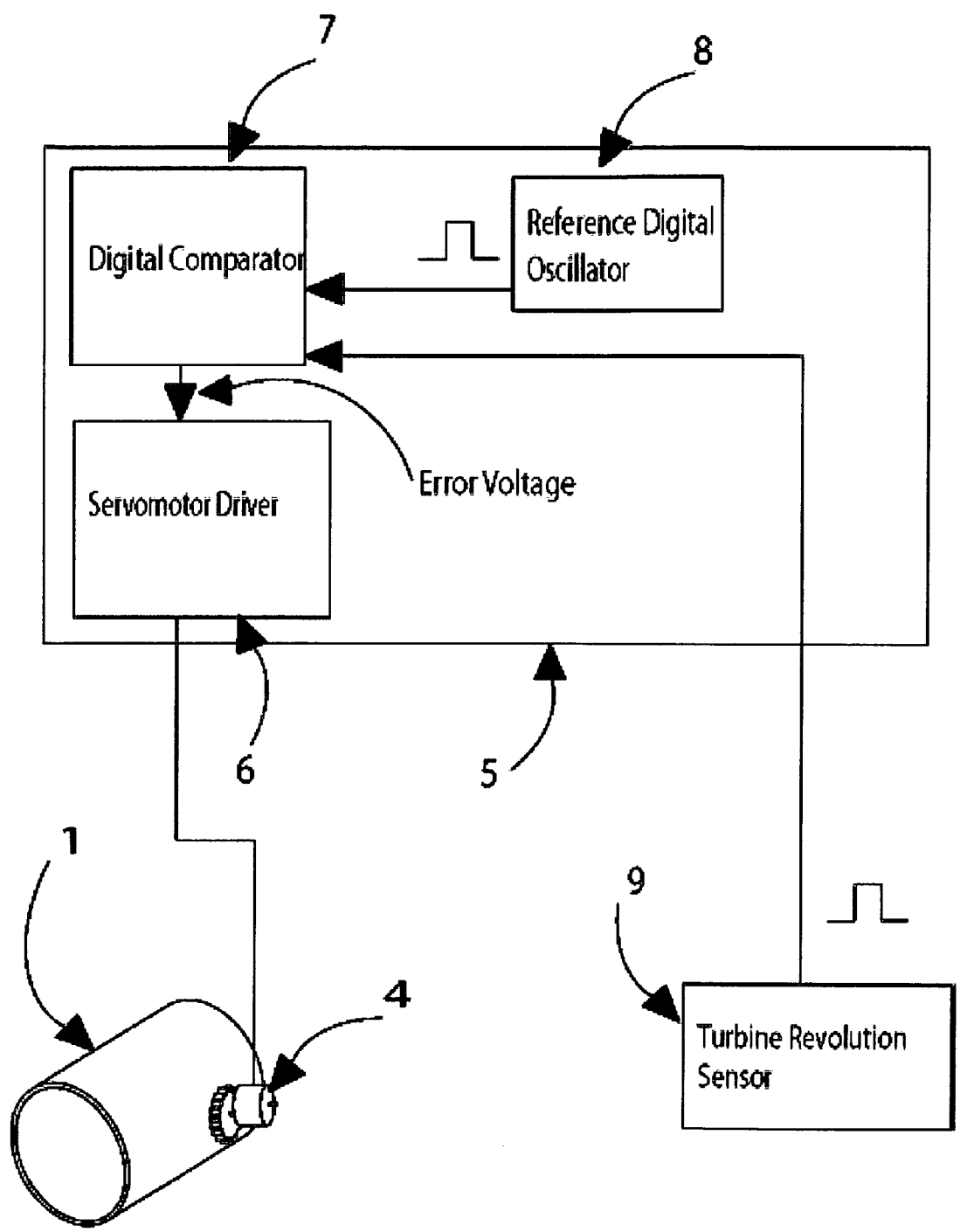
FIG. 2 is a plan view of a digital control that will control the opening and closing of the flapper that controls the flow of air through the turbine.

FIG. 1 is a perspective view of an air flow valve 1 that is used to control the speed of the turbine. Here is seen the different parts. FIG. 1A is a proportional view. FIG. 1B is a front view of the valve 1. FIG. 1C is a side view showing the gears 3 that are used to increase the total torque applied to the flapper 2. Also here is seen the servomotor 4.

FIG. 2 is a block diagram of the digital control that will control the opening and closing of the flapper 2 that controls the flow of air through the turbine.

The valve 1 is placed between the input of the turbine and the output of the pressure chamber or oscillating air column. The control system 5 will control the valve 1 in the following way. As the speed of the turbine increases the turbine revolution sensor 9 sends this information to the digital comparator 7. Here this data is coppered to the reference digital oscillator 8 and an error voltage is produced in the correct proportion as to cause the servomotor 4 to close the flapper 2 and decrease the air flow so as to decrease the turbine's speed. When the turbines speed decreases the turbine revolution sensor 9 sends this data to the digital comparator 7. This data is again coppered to the standard output of the reference digital generator. An error voltage is generated that is in the correct proportion that is applied trough the servomotor driver 6 to the servomotor 4. This error voltage will cause the flapper 2 to open and increase the air flow. Which will increase the turbines speed. The desired revolutions per a minute are changed by changing the output frequency of the reference digital oscillator 8. This action will maintain the turbines revolution constant. The gears 3 are used to increase the torque to the correct level so that the flapper 2 is moved at the correct speed and force. As seen in FIG. 1C the flapper 2 can move through an angle of 90 degrees, that is from a horizontal position to a vertical position.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A sea wave turbine speed control for controlling the speed of bidirectional turbines used to produce motive force from sea waves, comprising:

means for controlling the flow of air through the turbine and the speed of the turbine;

means for closing or opening the means for controlling the flow of air through the turbine and the speed of the turbine;

means for increasing a torque that is applied to the means for closing or opening;

means for moving the means for closing or opening in the correct direction of opening or closing the means for controlling the flow of air through the turbine and the speed of the turbine;

means for monitoring the actual speed of the turbine;
means for controlling the opening and closing of the means for closing or opening and ultimately controlling the speed of the turbine, comprising:
means for amplifying an error voltage to the correct level to power the means for moving;
    means for setting a reference speed of the turbine to be coppered with the actual speed of the turbine; and
    means for comparing the timing between the means for monitoring the actual speed of the turbine and the means for setting the reference speed of the turbine to be coppered with the actual speed of the turbine, and produce an error voltage in accord to the deference between the two;
    means for amplifying the error voltage to the correct level to power the means for moving the means for closing or opening.

2. The sea wave turbine speed control in accordance with claim 1, wherein said means for controlling the flow of air through the turbine and the speed of the turbine comprises a valve.

3. The sea wave turbine speed control in accordance with claim 1, wherein said means for closing or opening the means for controlling the flow of air through the turbine and the speed of the turbine comprises a flapper.

4. The sea wave turbine speed control in accordance with claim 1, wherein said means for increasing the toque that is applied to the means for closing or opening comprises a plurality of gears.

5. The sea wave turbine speed control in accordance with claim 1, wherein said means for moving the means for closing or opening in the correct direction of opening or closing the means for controlling the flow of air through the turbine and the speed of the turbine comprises a servomotor.

6. The sea wave turbine speed control in accordance with claim 1, wherein said means for controlling the opening and closing of the means for closing or opening and ultimately controlling the speed of the turbine comprises a control system.

7. The sea wave turbine speed control in accordance with claim 1, wherein said means for amplifying the error voltage to the correct level to power the means for moving the means for closing or opening comprises a servomotor driver.

8. The sea wave turbine speed control in accordance with claim 1, wherein said means for comparing the timing between the means for monitoring the actual speed of the turbine and the means for setting the reference speed of the turbine to be coppered with the actual speed of the turbine, and produce an error voltage in accord to the deference between the two comprises a digital comparator.

9. The sea wave turbine speed control in accordance with claim 1, wherein said means for setting the reference speed of the turbine to be coppered with the actual speed of the turbine comprises a reference digital oscillator.

10. The sea wave turbine speed control in accordance with claim 1, wherein said means for monitoring the actual speed of the turbine comprises a turbine revolution sensor.

11. A sea wave turbine speed control for controlling actual speed of bidirectional turbines used to produce motive force from sea waves, comprising:
    a valve, for controlling the flow of air through the turbine and the actual speed of the turbine;
    a flapper, for closing or opening the valve;
    a plurality of gears, for increasing a torque that is applied to the flapper;
    a servomotor, for moving the flapper in the correct direction of opening or closing the valve;
    a turbine revolution sensor, for monitoring an actual speed of the turbine;
    a control system, for controlling the opening and closing of the flapper and ultimately controlling the actual speed of the turbine, comprising:
        a reference digital oscillator, for setting a reference speed of the turbine to be coppered with the actual speed of the turbine;
        a digital comparator, for comparing the timing between the turbine revolution sensor and the reference digital oscillator, and produce an error voltage in accord to the deference between the two; and
        a servomotor driver, for amplifying the error voltage to the correct level to power the servomotor.

* * * * *